T. T. BERNARD.
PISTON RING.
APPLICATION FILED MAY 12, 1916.
1,261,897.
Patented Apr. 9, 1918.
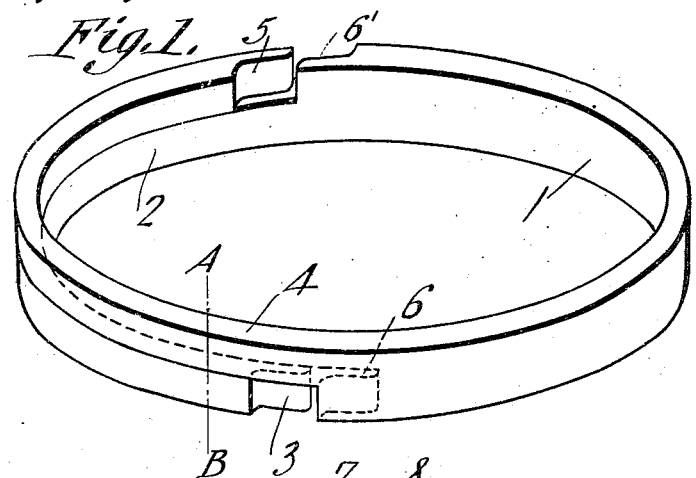
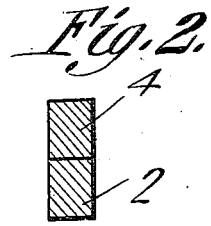
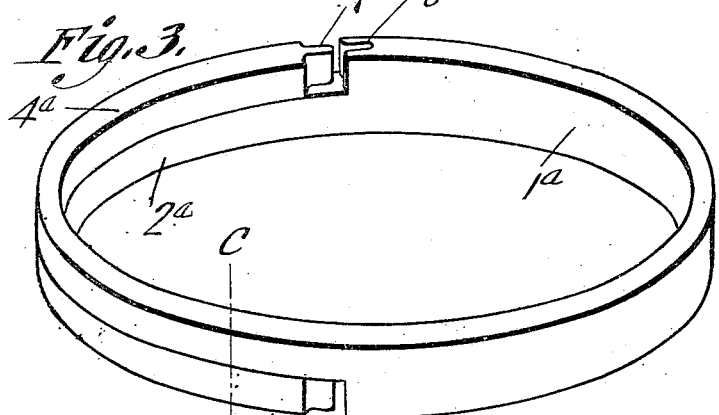
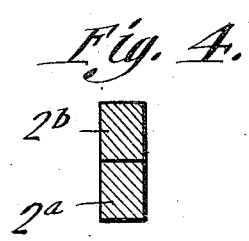
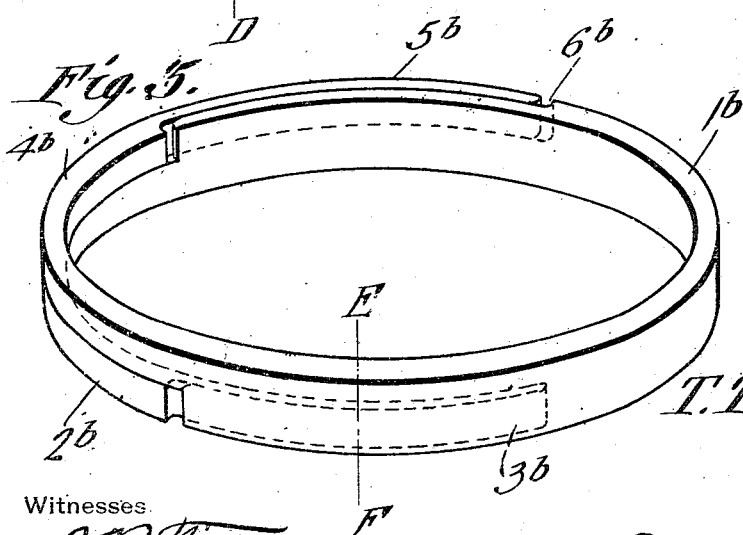
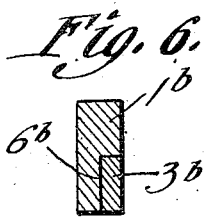
T. T. Bernard

UNITED STATES PATENT OFFICE.

THOMAS THEO. BERNARD, OF ST. LOUIS, MISSOURI.

PISTON-RING.

1,261,897.

Specification of Letters Patent.   Patented Apr. 9, 1918.

Application filed May 12, 1916.   Serial No. 97,130.

*To all whom it may concern:*

Be it known that I, THOMAS THEO. BERNARD, a citizen of the United States, residing at St. Louis, and State of Missouri, have invented a new and useful Piston-Ring, of which the following is a specification.

This invention relates to piston rings, one of its objects being to provide a one piece split ring which will expand freely for the purpose of making intimate contact with the cylinder and which is so constructed that it will prevent all possible escape of pressure such as has heretofore occurred where one piece piston rings have been used.

It has been found by actual tests that cast iron rings such as generally employed have very little resiliency and as a quick expansion of the ring is necessary to prevent leakage, especially in old engine cylinders which have become worn so as to be larger at one end than the other, the most effective form of ring heretofore used has been the ordinary split ring in which the ends come together. Such a ring, however, has not prevented leakage and, for the purpose of preventing such leakage, various types of two piece rings have been devised. It has been found, however, that where rings are formed of two pieces, the quick expansion is practically eliminated. Therefore while leakage is prevented in some of these structures between the ends of the split rings, such leakage will occur as a result of the slow expansion of the ring, and the inability of the ring to bind with sufficient pressure upon the cylinder.

Another disadvantage heretofore present in the use of two piece rings resides in the fact that during the reciprocation of the piston, the hot oil is scraped from the cylinder walls and accumulates in the space between the sections of the rings. This oil ultimately carbonizes within the space so that the ring sections ultimately become bound together to such an extent as to make practically a one piece non-expansible ring.

One of the objects of the present invention is to provide a one piece ring so constructed that leakage will not occur where the ends of the ring come together and which ring will expand as quickly as the ordinary split ring so as at all times to press with sufficient force against the cylinder to prevent leakage past the piston ring. In other words, the ring constituting the present invention has all of the advantages of the ordinary split ring and of the ordinary two piece ring without any of the disadvantages incident to either form of ring mentioned.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—

Figure 1 is a perspective view of a piston ring embodying the present improvements.

Fig. 2 is a section on line A—B Fig. 1.

Fig. 3 is a perspective view of another form of split ring.

Fig. 4 is a section on line C—D Fig. 3.

Fig. 5 is a perspective view of another form of ring.

Fig. 6 is a section on line E—F Fig. 5.

Referring to the figures by characters of reference 1 designates a segment of a ring extending through approximately 180 degrees and which segment is of uniform width and thickness. Extending from one end of the segment is an arcuate arm 2 approximately one-half the width of the segment 1 and having the outer portion of its free end cut away to produce a reduced terminal or tongue 3. Another oppositely disposed arcuate arm 4 is formed integral with the other end of the segment 1 and has the inner portion of its free end cut away to produce a reduced terminal or tongue 5. The two arms 2 and 4 contact throughout their length and the combined width of these arms is equal to the width of the segment 1. Furthermore the side edges of the segment 1 form continuations of the corresponding edges of the arms 2 and 4. Recesses 6 and 6' are formed in the ends of the segment 1 so as to receive the respective terminals 3 and 5 when the ring is fully compressed.

It will be obvious that when a ring such as herein described is in position on a piston, it will be capable of quickly expanding against the wall of the cylinder and, by reason of the particular lapped arrangement of the arms 2 and 4, leakage past the ring where the ends come together is prevented. Furthermore it becomes impossible for any pressure to escape into the space, for example, between the terminal 5 and the recess 6' and then along the inside of the ring to the space between the terminal 3 and its recess 6 because should the pressure get in behind the ring it will tend to press the arms 2 outwardly, thus binding the terminal 3 with increased pressure against the wall of the recess 6.

Instead of providing arms with laps such as shown in Fig. 1, the oppositely arranged arms 2ᵃ and 4ᵃ shown in Fig. 3 can be provided with centrally disposed tongues 7 designed to enter recesses 8 provided in the ends of the segment 1ᵃ.

In Fig. 5 another modified construction has been illustrated. This structure differs from that shown in Fig. 1 only by increasing the length of the recesses 6ᵇ in the segments and also correspondingly increasing the length of the terminals or tongues 3ᵇ and 5ᵇ. In other respects the construction of this ring is the same as that shown in Fig. 1.

The rings, with the exception of the one shown in Fig. 3, which may be placed either way, are placed on the piston in the position shown in the accompanying drawing, that is, with the arm 4 or 4ᵇ as the case may be, toward the head end of the piston.

In each of the structures illustrated the action is the same, leakage of pressure past the ring being prevented to the same extent as though the ring were formed of two pieces. However, the resiliency or quick expansion of the ring is not interfered with. Furthermore the cost of each of the rings referred to is nominal and it has been found in practice that a ring such as described can be made for about seven cents, whereas the complicated rings usually employed for the purpose of getting, if possible, equally good results, sell at about $1.25. Thus it will be seen that the present device possesses the advantages of low cost, efficiency in preventing leakage between the ends, quick expansion to prevent leakage between the ring and cylinder wall, and simplicity of construction which prevents disarrangement of parts.

What is claimed is:—

A piston ring, comprising a substantially semicircular segment, said segment provided with recesses in each end thereof, the recess at one end being in the outer face of the ring and at the head side thereof, the recess at the opposite end being in the inner face of the ring and at the opposite side thereof, arcuate arms extending from the respective ends of the segments, and a tongue extending from the free end of each arm and adapted to enter a recess.

In testimony that I claim the foregoing as my own, I have hereto affixed my signature in the presence of two witnesses.

THOMAS THEO. BERNARD.

Witnesses:
P. F. VANDER LIPPE,
CHAS. E. QUICK.